G. Stone.

Harvester Cutter.

No 2732 Reissued Aug. 13, 1867.

Witnesses

Andrew Whiteley

Philip C. Dieterich.

Inventors.

Gustavus Stone

By his atty

R. D. A. Smith

451 Seventh St.

United States Patent Office.

GUSTAVUS STONE, OF BELOIT, WISCONSIN.

*Letters Patent No.* 14,070, *dated January* 8, 1856; *reissue No.* 2,732, *dated August* 13, 1867.

IMPROVEMENT IN HARVESTER-CUTTERS.

The Schedule referred to in these Letters Patent and making part of the same.

TO ALL WHOM IT MAY CONCERN:

Be it known that I, GUSTAVUS STONE, of Beloit, in the county of Rock, and State of Wisconsin, have invented a new and useful Improvement in Grass-Cutting Blades for Mowing Machines; and I do hereby declare the following to be a full, clear, and exact description of the same, reference being had to the accompanying drawings, in which—

Figure 1:
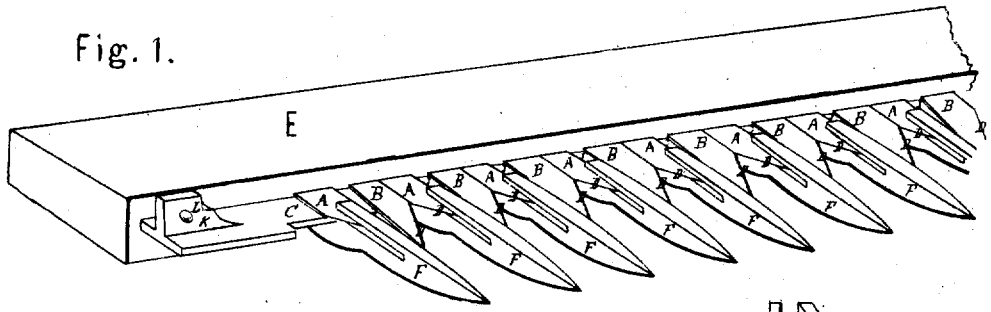
Figure 1 is a perspective view of a portion of the cutting apparatus of a mowing machine exhibiting my improvements.
Figure 4:
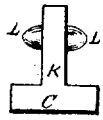
Figure 4 is an end elevation of the heel of the sickle-bar.
Figure 5:
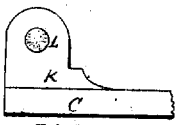
Figure 5 is a side elevation of the same.
Figure 6:
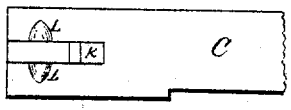
Figure 6 is a plan of the same.
Figure 7:
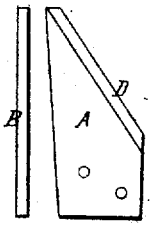
Figure 7 represents in plan and elevation one of cutters.
Figure 3:
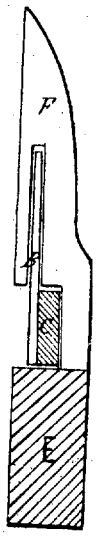
Figure 3 is a vertical cross-section on line *x x*.
Figure 2:
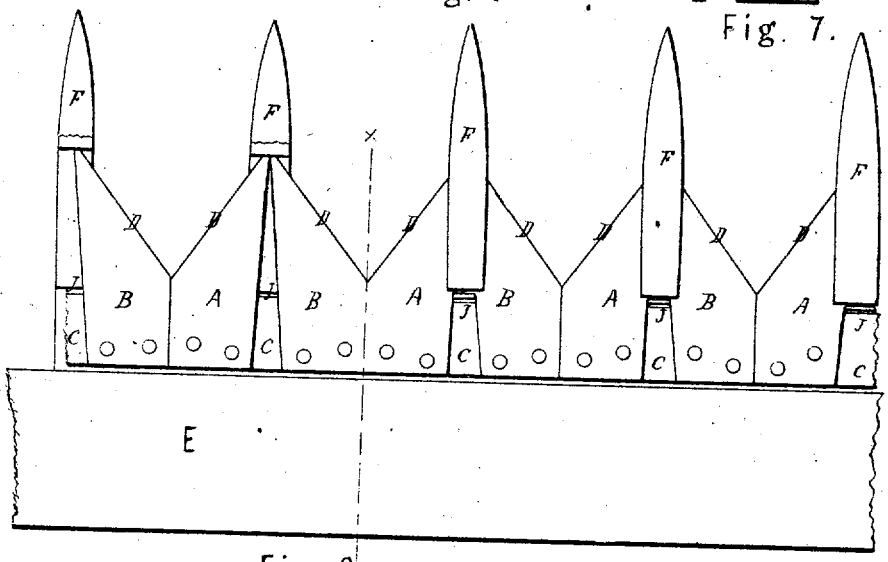
Figure 2 is a plan of the same enlarged.

My invention consists, first, in forming each cutting section of two parts, so that each cutting edge will be upon a separate piece, and with a clearing space between the two parts, so as to clear itself effectually of clogging matter; and, second, in forming one-half of the pitman joint with two projecting conical or conoidal points at the heel of the sickle-bar.

A B, A B, &c., are the two pieces of steel which make up one section of the grass-cutting blade; C is the sickle-bar to which the sections A B are riveted; D D are the cutting edges of the blades; E is the finger-bar; F F are the guard-fingers; J J are the openings or clearing spaces between the parts A B of the several sections; K is the heel of the sickle-bar; L L, the conical or conoidal points projecting laterally from the same.

The grass-cutting blades hitherto in common use in mowing machines are made by riveting to a bar of iron sections of steel, each of which is a single piece, and has two cutting edges bevelled in opposite directions from a central point. These edges cut alternately as the bar is moved in opposite directions, so as to bring each section under a finger or guard, against which it makes a shearing cut. These cutters frequently draw the fine grass in between the cutting sections and the finger or guard, where it hangs and clogs the machine, rendering it nearly useless. Different plans have been tried for overcoming this difficulty, all of which, however, use the same general form of section with two cutting edges upon the same piece of steel.

My first improvement consists in making each section of the cutting blades of two pieces of steel, A and B, with but one cutting edge D upon each, and in placing them upon the sickle-bar C in such a way that their cutting edges shall face in opposite directions, and that there shall be a wedge-shaped opening, J, between their backs, closed at their points, but widening out toward the sickle-bar C. These pieces A B, A B, &c., may be fastened to the sickle-bar C with rivets or screws, or in any other well-known way. This manner of making grass-cutting blades allows each cutting edge D to be adjusted in its place separately, and therefore more perfectly than heretofore. The space J between the backs of the pieces A B effectually prevents the grass from clogging in the fingers or guards. This plan has been fully tested and found fully to succeed, when, in consequence of their clogging, the common mode has failed entirely, and the whole may be constructed at reduced cost.

The advantages of this way of making the blades are, first, the great saving of the sheet steel from which they are cut, they being very little waste; second, their being in sections, should one section become injured, which often happens, only one-half, (instead of a whole,) is lost; third, the opening extending from point to heal of the blade, has just so much more clearing space than where a hole is punched through. I do not punch at all. The sections in being cut from the sheet or bar are finished, so far as shape is concerned. The sections I use can be made from the waste metal in Forbush's plan, and this saving alone is very important. Besides, I have a clearing surface for the whole depth of the blade, which is not found in any other blade of which I have knowledge.

My second improvement consists in replacing the loose bolt, which is usually employed to connect the heel of the sickle-bar with its pitman, with two conical or conoidal points L rigidly attached to the heel K of the sickle-bar C and projecting laterally therefrom. It has been heretofore been customary to bore a hole straight through the heel of the sickle-bar from side to side, and to insert through this hole, and through a corresponding hole or holes in the end of the pitman, a joint bolt, which was then secured by a key or screw-nut. It is quite evident that such a bolt, not being rigidly connected to either the pitman or sickle-bar, would permit twice the amount of lost motion in the joint that would be experienced, provided it should be made fast to one or the other part. The cutting apparatus of a mowing machine fails at this joint more frequently than at any other point, and this is mainly in consequence of the amount of lost motion. As the joint wears loose the lost motion increases, and with every reciprocation a more and more violent jerk is experienced, finally causing the sickle-eye to give way and the machine to be rendered useless for the time being. I have therefore discarded the loose bolt, and employ in its stead the two conical or conoidal points L L, rigidly secured to the sickle-bar. This of itself will diminish the lost motion one-half, because it reduces by one-half the frictional surface, but by the conical or conoidal form of the points L L, according to well-understood mechanical princilples, all lost motion at this joint may be prevented.

In practice I form the points L L by cutting a bar of steel at the proper length, turning off its ends in a lathe until they are of proper shape, leaving a cylindrical portion in the middle. The hole through the heel K of the sickle-bar is then made true and of proper size, the heel K heated, and the pointed bar L inserted through said hole. When the heel becomes cold it will have shrunk upon the bar L, and will hold it thereafter with complete firmness. The points L L may be tempered, as desired.

I do not claim the invention of mowing machines, or of the several parts thereof generally, but what I do claim as new, and desire to secure by Letters Patent, is—

1. Making the sections of which the grass-cutting blades are usually made of two pieces of steel, A and P, with but one cutting edge D upon each, and so placing them upon the sickle-bar C that there shall be a wedge-shaped opening, J, between their backs, closed at the points and widening out towards the bar.

2. Providing the heel K of the sickle-bar C with the conical or conoidal points L L, or their equivalents, for the purpose shown and described.

Witnesses:

D. W. C. Castle,

R. H. Mills.

GUSTAVUS STONE.